(12) United States Patent
Carter et al.

(10) Patent No.: US 11,489,278 B2
(45) Date of Patent: Nov. 1, 2022

(54) MULTI-CONDUCTOR ROTARY CONNECTOR

(71) Applicant: RAMPART PRODUCTS LLC, Houston, TX (US)

(72) Inventors: Sean W. Carter, Houston, TX (US); Michael A. Czuppon, Houston, TX (US); Edward J. Beshoory, Houston, TX (US)

(73) Assignee: RAMPART PRODUCTS LLC, Houston, TX (US)

( * ) Notice: Subject to any disclaimer, the term of this patent is extended or adjusted under 35 U.S.C. 154(b) by 0 days.

(21) Appl. No.: 17/538,744

(22) Filed: Nov. 30, 2021

(65) Prior Publication Data
US 2022/0085537 A1 Mar. 17, 2022

Related U.S. Application Data

(62) Division of application No. 16/864,643, filed on May 1, 2020, now Pat. No. 11,217,928.
(Continued)

(51) Int. Cl.
*H01R 13/187* (2006.01)
*H01R 39/64* (2006.01)
(Continued)

(52) U.S. Cl.
CPC ........... *H01R 13/187* (2013.01); *H01R 13/10* (2013.01); *H01R 13/111* (2013.01); *H01R 13/17* (2013.01); *H01R 24/58* (2013.01); *H01R 39/64* (2013.01)

(58) Field of Classification Search
CPC .... H01R 13/187; H01R 13/10; H01R 13/111; H01R 13/17; H01R 24/58; H01R 39/64; H01R 13/5202; H01R 39/00; H01R 24/38
See application file for complete search history.

(56) References Cited

U.S. PATENT DOCUMENTS

| 8,694,103 B2 * | 4/2014 | Barker ..................... A61N 1/05 607/37 |
| 11,139,603 B2 * | 10/2021 | Conger ................ A61N 1/3752 |
| 11,217,928 B2 * | 1/2022 | Carter .................... H01R 24/58 |

FOREIGN PATENT DOCUMENTS

CN 111834852 A * 10/2020 ............. H01R 39/64

OTHER PUBLICATIONS

Machine Translation CN-111834852-A, (2020-10-27), pp. 8-13 (Year: 2022).*

* cited by examiner

*Primary Examiner* — Travis S Chambers
(74) *Attorney, Agent, or Firm* — Bracewell LLP; Douglas W. Rommelmann

(57) ABSTRACT

An electrical connector comprising a plug arranged and designed to connect to a receptacle. The plug includes an electrically-insulating body, a conductor ring, and a conductive member connected to the plug conductor ring. The receptacle includes an electrically-insulating body, a conductor ring having an axial inner bore and an annular groove facing radially inward, a conductive member connected to the receptacle conductor ring, and an electrically-conductive contact having a generally annular profile, at least a portion of the electrically-conductive contact received in and contacting the annular groove and at least a portion of the electrically-conductive contact not received in the annular groove. Upon insertion of the plug into the receptacle and substantially radially aligning the plug and receptacle conductor rings, the electrically-conductive contact is elastically deformed and provides electrical contact between the plug conductor ring and the receptacle conductor ring.

13 Claims, 14 Drawing Sheets

Related U.S. Application Data

(60) Provisional application No. 62/842,841, filed on May 3, 2019.

(51) Int. Cl.
*H01R 13/10* (2006.01)
*H01R 13/17* (2006.01)
*H01R 13/11* (2006.01)
*H01R 24/58* (2011.01)

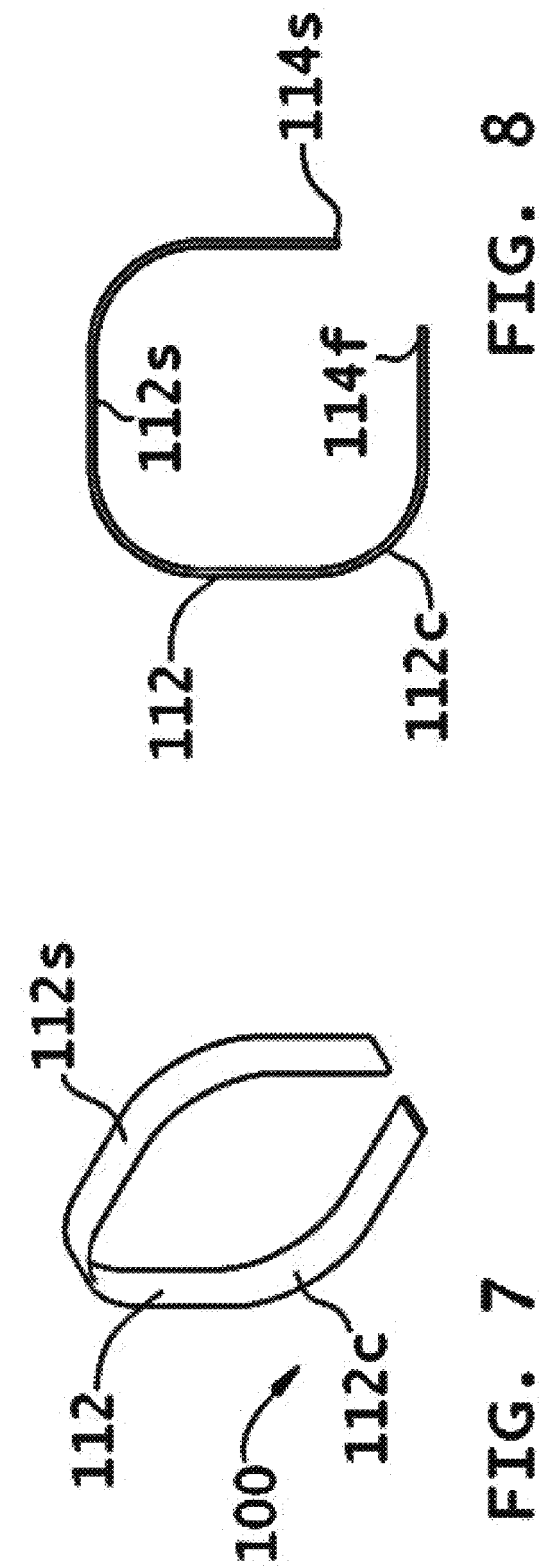

MULTI-CONDUCTOR ROTARY CONNECTOR

CROSS-REFERENCE TO RELATED APPLICATIONS

This application is a divisional application of U.S. application Ser. No. 16/864,643, filed May 1, 2020, which claims the benefit of U.S. Provisional Application Ser. No. 62/842,841, filed May 3, 2019, entitled "Multi-Conductor Rotary Connector." Applicant incorporates by reference herein application Ser. Nos. 16/864,643 and 62/842,841 in their entirety.

BACKGROUND OF THE INVENTION

1. Field of the Invention.

The present invention relates generally to electrical, multiple conductor rotary connectors, and more specifically to the contacts for electrical, multiple conductor rotary connectors.

2. Description of the Related Art.

Electrical rotary connectors typically include a male assembly and a female assembly that engage one another and permit rotation of the male and female assemblies with respect to one another. Oftentimes, the joining of the male and female assemblies will have relative rotation as a result of threaded members. Sometimes it is desirable, that upon mating of the male and female assemblies to one another, for relative rotation to exist between the two assemblies while maintaining the electrical contacts.

The male assembly is adapted to removably seat in the female assembly. The male assembly typically has at least two spaced conductor rings on an outer surface and the female assembly has a corresponding number of spaced conductor rings on an inner surface spaced so as to be juxtaposed with the male assembly conductor rings when the male assembly is seated in the female assembly.

Typically, a member often referred to as a contact or electrically-conductive contact is positioned in an annular space between the juxtaposed conductor rings to allow for connector make-up, manufacturing tolerances and to ensure electrical connectivity is maintained between each pair of juxtaposed conductor rings when the male and female assemblies are mated.

One type of contact used by Greene, Tweed & Company of Kulpsville, PA, is a multi-leaf spring contact. The multi-leaf spring contact is installed within the female assembly. Thin metal leaves are uniformly spaced around the conductor ring in the axial direction with a "free end" of the metal leaf facing the rear of the female assembly. A rubber O-ring is positioned beneath the "free end" to energize the thin leaf springs.

Some shortcomings with the O-ring energized multi-leaf spring contact are: the thin metal leaves are fragile and break easily; the thin metal leaves are easily snagged during cleaning with rags, etc. thus causing breakage and/or permanent damage; low conductor cross-sectional area limiting electrical current capacity; the O-ring energizers are subject to compression set at elevated temperatures; does not allow for unitized plastic molding around contacts due to many leak pathways; and not axially compact.

U.S. Pat. No. 7,052,297 titled "Rotary Connector having Removable and Replaceable Contacts," assigned to Wireline Technologies, Inc. of Houston, Tex., discloses a canted coil spring contact for rotary connectors. The objects of the invention in the '297 patent are to provide an electrically-conductive contact that is replaceable and that is easily and quickly replaced in the field without extensive disassembly of the rotary connector. Although canted coil springs are easily replaced, they are suspect/prone to having very low durability—especially in harsh operating conditions such as high temperature, high pressure environments, or when subjected to vibrational forces, or cyclical loading-experienced in many applications where rotary connectors are used. The canted coil spring often cracks during operation and is prone to getting snagged and dislodged when cleaning the connector. The canted coil spring may become dislodged during connection or disconnection of the coupler or due to allowable manufacturing tolerances of the connector which may result in slight misalignment of the mating connectors. The canted coil spring is not axially compact as it becomes ovoid when squeezed radially during mating of the rotary connector.

Another prior art rotary electrical connector includes spring-loaded pogo pin contacts. Pogo pins are subject to movement during shock and vibration thus causing potential electrical signal issues and mechanical damage. Pogo pins are prone to shearing during mating of connectors thus causing permanent damage. Other disadvantages with spring-loaded pogo pin contacts are: pogo pins are not replaceable; no unitized plastic molding around contacts is possible due to plastic invasion into back side of the pogo canister; and not radially or axially compact so connectors cannot be as compact.

It is desirable to have a rotary electrical connector that is durable, can withstand intense vibrations and is resistant to fatigue failure. It is further desirable that the connector is durable over numerous connect and disconnect cycles. It is further desirable that the rotary electrical connector is compact. It is further desirable that the rotary electrical connector can work in high temperature, high pressure (HTHP) environments, as for example in the oilfield. It is desirable that the contact has one or more of the following characteristics: high durability, high electrical current capacity, very high shock and vibration tolerance, and little likelihood of damage during maintenance and during connecting and disconnecting the rotary connector.

SUMMARY OF THE INVENTION

The preferred embodiments of the invention provide a rotary connector having a plug and a receptacle with high durability during operation, in addition to having very low likelihood of damage during maintenance. In the rare event that a contact is damaged, the contact is replaceable. The rotary connector has very high shock and vibration tolerance making it well-suited for use in extreme and difficult environments. The preferred embodiments provide a connector having high electrical current capacity. The rotary connector is radially and axially compact, thus allowing for a smaller form factor connector. At least some of the embodiments allow for unitized molded assembly.

BRIEF DESCRIPTION OF THE SEVERAL VIEWS OF THE DRAWINGS

The aspects, features, and advantages of the embodiments of the invention mentioned above are described in more detail by reference to the drawings, wherein like reference numerals represent like elements having the same basic function, in which:

FIG. 7 is a perspective view of a contact according to another embodiment of the invention;

FIG. 8 is a front view of the contact shown in FIG. 7;

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Figure 1:
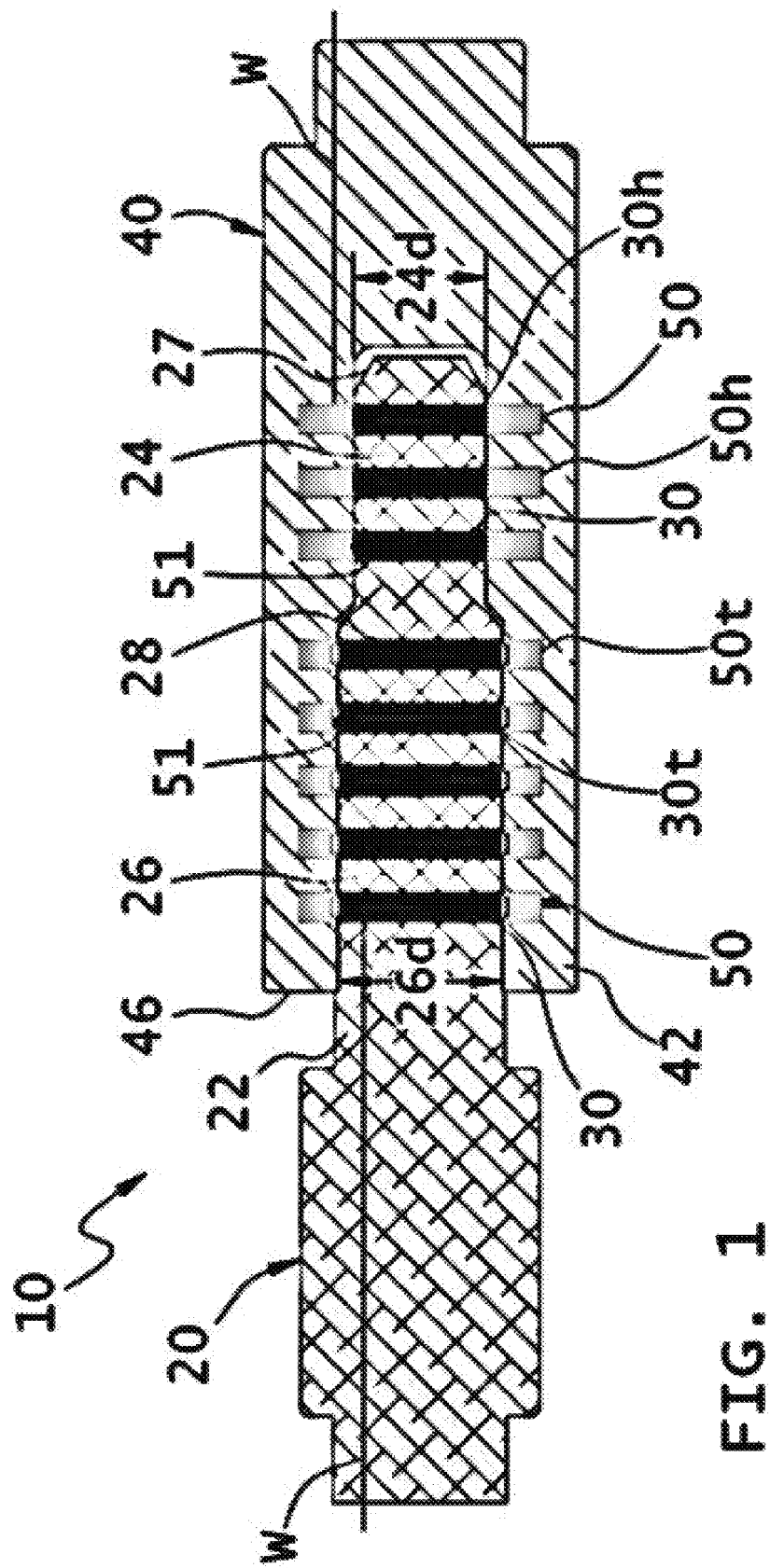
FIG. 1 is cross-sectional view of a rotary connector according to a preferred embodiment of the present invention, showing a plug inserted in a receptacle.

Referring to FIG. 1, a rotary connector, generally referred to as 10, is shown having a plug 20 fully inserted within a receptacle 40. The rotary connector 10 in FIG. 1 is an eight pin, stepped rotary connector. There are eight electrical conductor rings 30 of the plug 20 that are juxtaposed to and/or in substantially radial alignment with eight electrical conductor rings 50 of the receptacle 40 when the plug 20 is seated in the receptacle 40. It is to be understood that each pair of opposing conductor rings 30, 50 acts cooperatively to conduct electricity through the rotary connector 10.

An electrical wire or conductive member W is routed from each conductor ring 30 within the plug 20 and exits the rear of the plug 20 or connects to a terminal at the rear of the plug 20. Similarly, an electrical wire or conductive member W is routed from each conductor ring 50 within the receptacle 40 and exits the rear of the receptacle 40 or connects to a terminal at the rear of the receptacle 40. For purposes of clarity, FIG. 1 shows only one wire W connected to one plug conductor ring 30 and one wire W connected to one receptacle conductor ring 50. As is well understood in the art, each conductor ring 30 and 50 is connected to a separate wire or conductive member W which is accessible or exits at the rear of the plug 20 and receptacle 40, respectively.

It is to be understood that the number of pairs of conductor rings 30, 50 will depend on the number of electrical signals or pathways needed for the specific rotary connector 10. Thus, while eight pairs of conductor rings are shown in FIG. 1, this is merely for illustration and not limiting to the invention.

As stated above, the rotary connector 10 shown in FIG. 1 is a stepped rotary connector. The plug 20 has a stepped outer diameter and the receptacle 40 has a stepped inner diameter. It is to be understood that this is well known to those skilled in the art and often used when there are several pairs of conductor rings 30, 50 in the rotary connector 10. It is to be understood that the plug 20 and receptacle 40 of the present invention could both have a uniform diameter or both have a plurality of stepped diameters.

Figure 2:
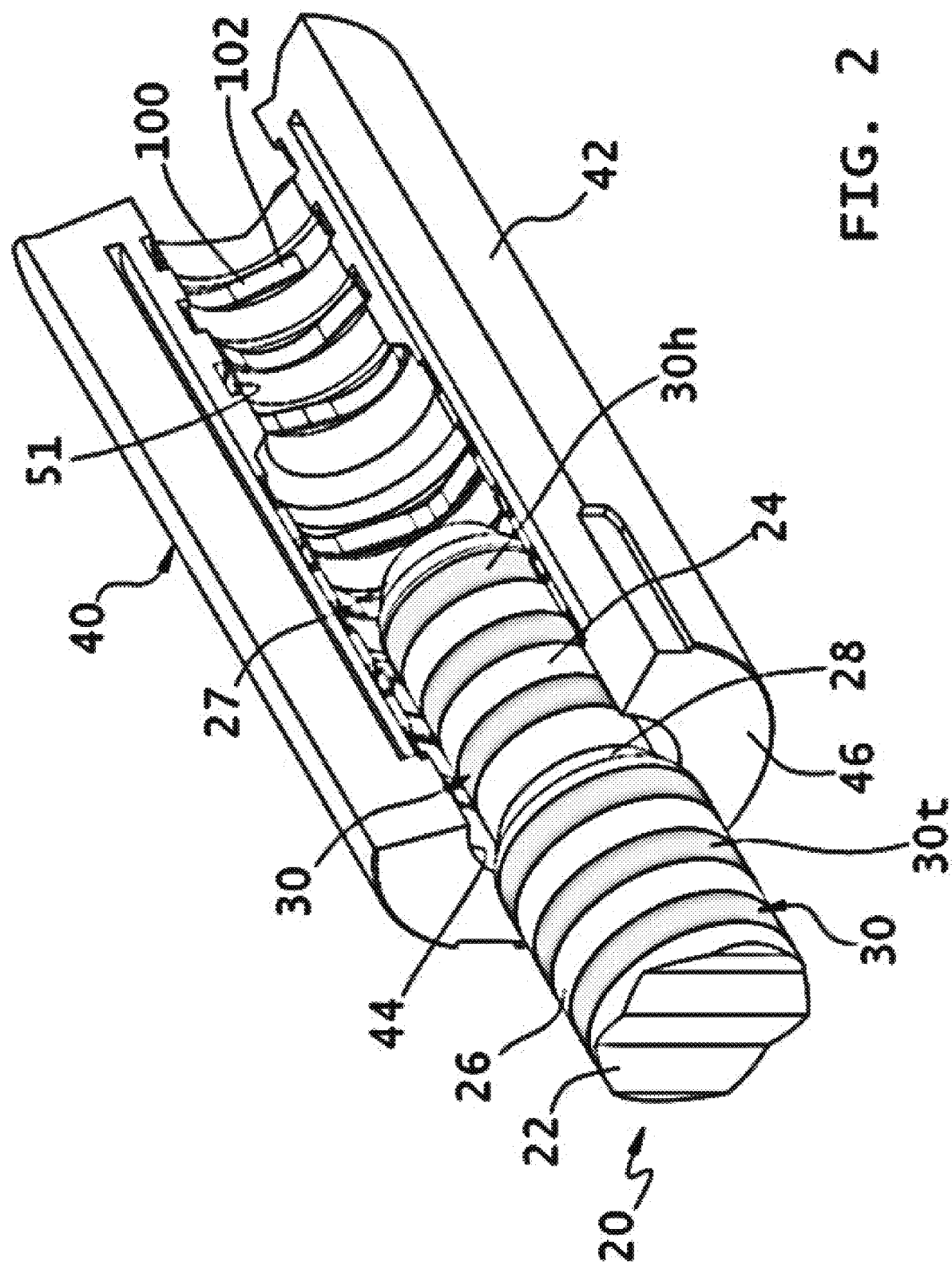
FIG. 2 is a partial perspective view of the rotary connector of FIG. 1, the perspective view having a portion of the receptacle removed and showing the plug partially within the receptacle.

Referring to FIGS. 1 and 2, the plug 20 includes an insulating body 22 having a head portion 24 and a tail portion 26. The head portion 24 has a head diameter 24d and the tail portion 26 has a tail diameter 26d. A tapered transition 28 preferably joins the head portion 24 to the tail portion 26. The tail diameter 26d is larger than the head diameter 24d. It is to be understood that the plug insulating body 22 may alternatively be of uniform diameter. The plug insulating body 22 is preferably made of a dielectric or non-electrically conductive material. One such suitable material is polyether ether ketone (PEEK). A forward end 27 of the plug insulating body 22 is preferably tapered or rounded to provide guidance.

With reference to FIG. 1, the electrical conductor rings 30 of the plug 20 are preferably circular and have a smooth outer surface. FIG. 1 shows three conductor rings 30 on the head portion 24 and five on the tail portion 26. The number of plug conductor rings 30 will depend on the number of electrical signals or pathways needed for the specific rotary connector 10. The plug conductor rings 30 are separated from one another by a non-conducting ring, spacer or a portion of the plug insulating body 22 in the event the plug 20 is a molded assembly. The actual assembly of the plug 20 is not critical to the claimed invention. One of ordinary skill in the art is familiar with various ways of assembling the plug 20.

The plug conductor rings 30 preferably have an outer diameter substantially equal to or slightly greater than the corresponding diameter of the adjacent portion of the plug insulating body 22 in the embodiment shown in FIGS. 1 and 2. The plug conductor rings 30 on the head portion 24 are designated 30h and the plug conductor rings 30 on the tail portion 26 are designated 30t. The plug conductor rings 30 are made from an electrically conductive material, as for example, beryllium copper.

The receptacle 40 includes an insulating body 42 that is preferably substantially cylindrical and has a bore 44 open at a front end 46 of the receptacle 40. The bore 44 is sized and shaped to correspond with the size and shape of the head and tail portions 24 and 26 of the plug 20. The receptacle 40 includes a number of conductor rings 50 corresponding to the number of plug conductor rings 30. The receptacle conductor rings 50 that are arranged and designed to align with the plug conductor rings 30h on the head portion 24 are designated 50h and those arranged and designed to align with the plug conductor rings 30t on the tail portion 26 are designated 50t. The receptacle conductor rings 50h preferably have an axial, circular inner bore 50b (FIG. 5) with an inside diameter slightly greater than the head diameter 24d and the outside diameter of the head portion conductor rings 30h. Similarly, the receptacle conductor rings 50t preferably have an axial, circular inner bore with an inside diameter slightly greater than the tail diameter 26d and the outside diameter of the tail portion conductor rings 30t. The receptacle conductor rings 50 are made from an electrically conductive material, as for example, beryllium copper.

In a preferred embodiment as shown in FIGS. 1 and 2, a radially inward-facing groove 51, preferably annular, is made in the receptacle conductor rings 50 for at least partially receiving an electrically-conductive contact 100. Preferably, the inward-facing groove 51 is recessed radially outward of the inner bore 50b of the receptacle conductor rings 50. The contacts 100 are shown in the grooves 51 in FIG. 2. The electrically-conductive contacts 100 are made from an electrically conductive material.

Figure 4:
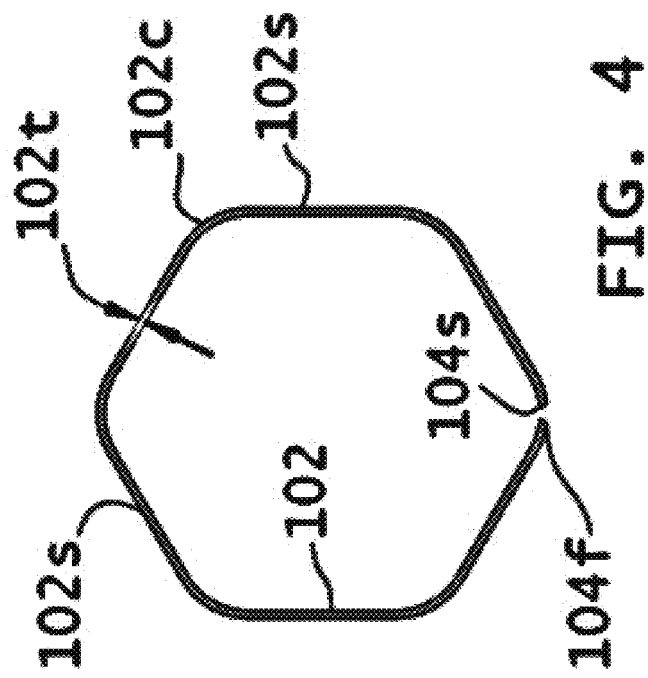
FIG. 4 is a front view of the contact shown in FIG. 3.
Figure 3:
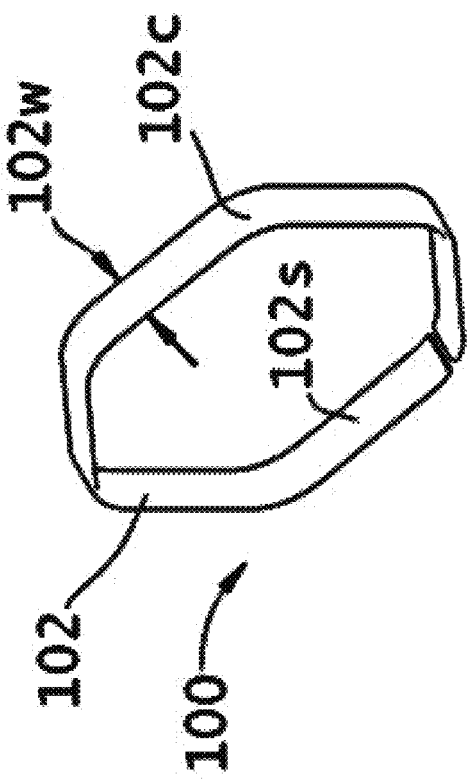
FIG. 3 is a perspective view of an electrically-conductive contact according to a preferred embodiment of the invention.

In some embodiments of the present invention, the electrically-conductive contact 100 has a generally annular profile defining an opening. FIGS. 3 and 4 show a preferred design for the electrically-conductive contact 100. FIGS. 3 and 4 show a generally polygonal-shaped contact 102 having arcuate portions or rounded corners or vertices 102c and generally straight segments 102s. The generally polygonal-shaped contact 102 shown in FIGS. 3 and 4 includes six substantially straight segments 102s joined by rounded corners 102c defining an opening within the generally polygonal-shaped contact 102. Preferably, the generally polygonal-shaped contact 102 is discontinuous and has first and second ends 104f and 104s, respectively. The contact 102 shown in FIGS. 3 and 4 is the contact 100 shown in the receptacle 40 in FIG. 2, although other embodiments of the electrically-conductive contact 100 could be used. Preferably, the first and second ends 104f, 104s are located at a rounded corner 102c when the contact 102 is to be installed in the receptacle 40 so that the ends 104f, 104s are in the groove 51 where they are unlikely to snag on anything.

Figure 5:
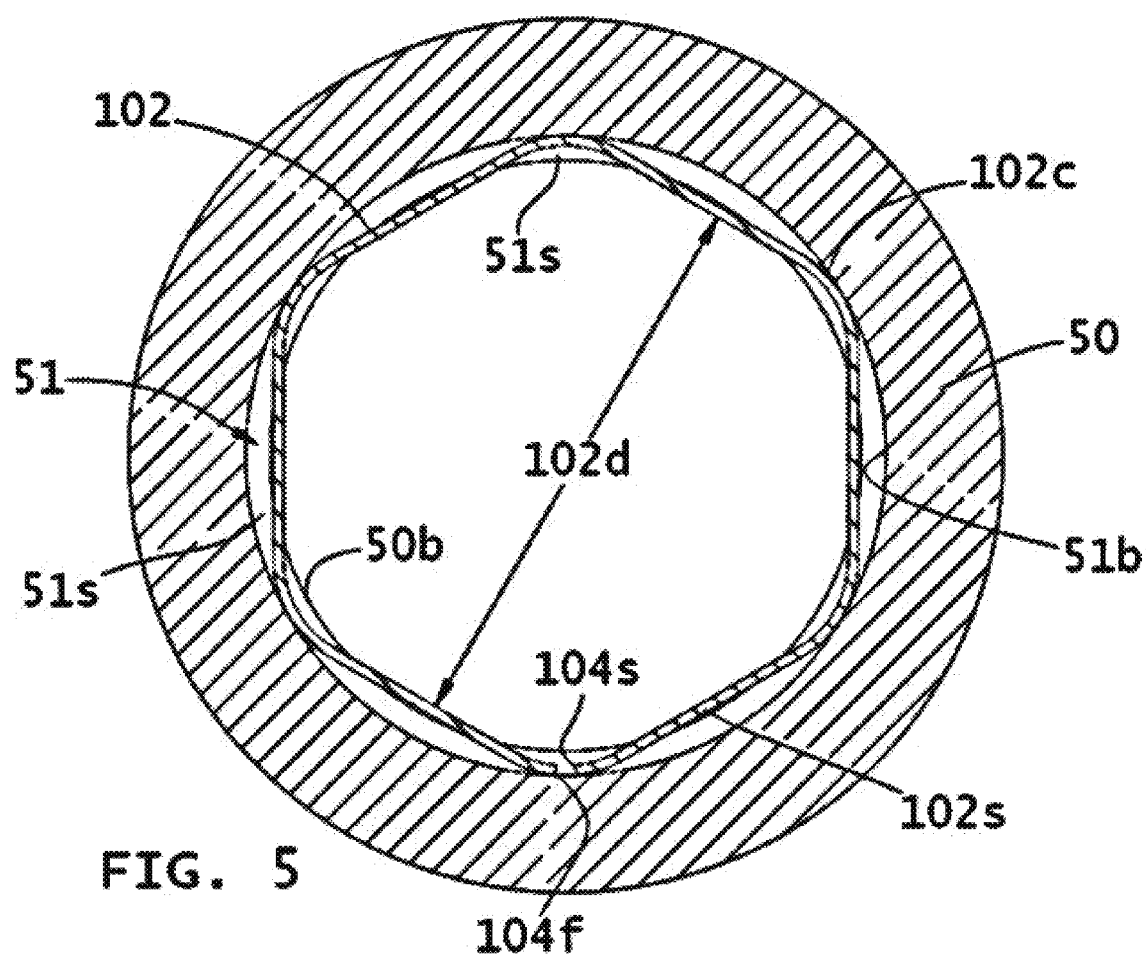
FIG. 5 is a cross-sectional view of the contact of FIGS. 3 and 4 received in a groove of a conductor ring in the receptacle, the contact shown in a relaxed position.

FIG. 5 shows a cross-sectional view of the six-sided polygonal-shaped contact 102 received within the groove 51 of the receptacle conductor ring 50. The groove 51 preferably has a pair of sidewalls 51s (only one shown) joined by a groove base 51b defining a groove width and a groove depth. Preferably, the sidewalls 51s extend radially outward from the inner bore 50b to the groove base 51b and the axial distance between the sidewalls 51s defines the groove width. Preferably, the groove width is in the range of about 0.001" to 0.015" wider than the contact width 102w. The groove depth is defined by the radial length of the sidewall 51s.

The contact 102 in FIG. 5 is in a relaxed position and has a relaxed inscribed diameter 102d. The generally straight segments 102s in the relaxed position define the relaxed inscribed diameter 102d. For the contact 102 shown in FIG. 5, the relaxed inscribed diameter 102d is the shortest distance between oppositely facing generally straight segments 102s. At least a portion, typically a mid-portion, of the generally straight segments 102s is positioned outside of the groove 51 in the relaxed position as shown in FIG. 5. Stated another way, the relaxed inscribed diameter 102d is smaller than the inside diameter of the receptacle conductor ring 50. Preferably, the relaxed inscribed diameter 102d is smaller than the outer diameter of the corresponding plug conductor ring 30.

Still referring to FIG. 5, the contact 102 is in the relaxed position when the plug 20 is uncoupled from the receptacle 40 and when the plug 20 is not juxtaposed or contacting the contact 102. The first and second ends 104f and 104s of the generally polygonal-shaped contact 102 are adjacent the groove base 51b and preferably have an edge portion contacting the groove base 51b. Preferably, each of the rounded corners 102c are in contact with the groove base 51b when in the relaxed position.

Figure 6:
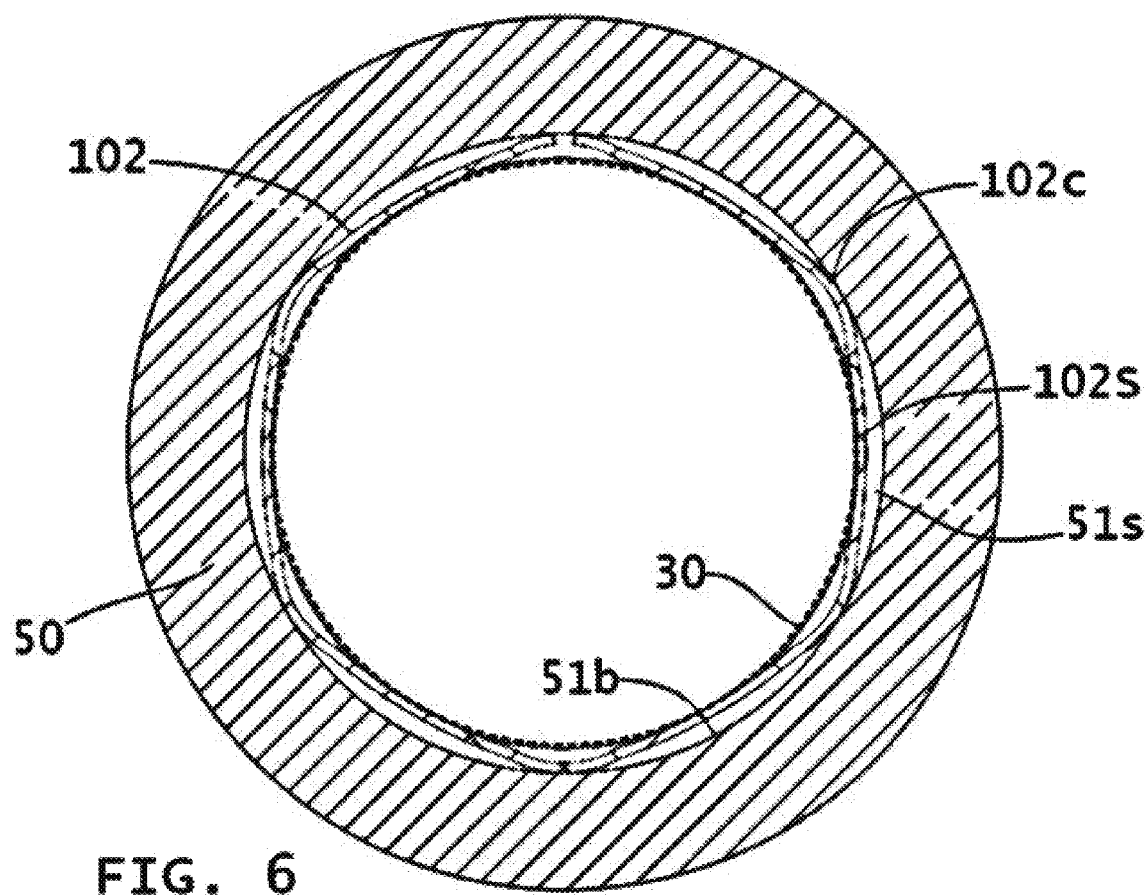
FIG. 6 is a cross-sectional view similar to FIG. 5, showing the contact in a deformed position with the conductor ring of the plug shown in dashed lines.

FIG. 6 is representative of when the plug 20 and receptacle 40 are fully joined or coupled together and the contact 102 is in an elastically deformed position. The outer surface of the plug conductor ring 30 is shown in dashed lines in FIG. 6. Since the outer diameter of the plug conductor ring 30 is preferably at least slightly larger than the relaxed inscribed diameter 102d of the contact 102, the juxtaposed plug conductor ring 30 forces the straight segments 102s to bend slightly outwardly such that the contact 102 is slightly more circular. As shown in FIG. 6, the elastically deformed straight segments 102s provide a substantial amount of surface area contact with the outer surface of the plug conductor ring 30. Additionally, the contact 102 concurrently retains substantial contact with the groove base 51b. It is also to be understood that a portion of the side surfaces of the contact 102 facing the groove sidewalls 51s will also likely be in contact with at least one of the sidewalls 51s. The contact 102 is sufficiently elastic such that electrical contact is achieved and maintained between the corresponding plug and receptacle conductor rings 30, 50, when the plug 20 and receptacle 40 are fully mated, yet when the plug 20 is disconnected or removed from the receptacle 40 the contact 102 remains in the groove 51 and returns to its relaxed position with an inscribed diameter 102d smaller than the outer diameter of the mating plug conductor ring 30.

In the mated condition of the plug 20 and receptacle 40, the plug conductor rings 30 are radially aligned, or substantially radially aligned, with corresponding receptacle conductor rings 50.

It is to be understood that the size and shape of the groove 51 is dependent on the type of contact 100 used, in addition to other design factors. Referring to FIGS. 3 and 4, the contact 102 has a width 102w and a thickness 102t. The groove width, defined by the distance between the sidewalls 51s, is preferably slightly wider than the contact width 102w. Following are some representative dimensions for the groove 51 and contact 102 merely for exemplary purposes to illustrate an embodiment. In this example, the contact 102 has a width 102w of 0.060" (inches) and a thickness 102t of 0.008" and the groove 51 has a width of 0.064" and a depth in the range of 0.016" to 0.027" depending on various factors. Preferably, the dimensions are such that the contact 102 is securely positioned within the groove 51 and remains elastic.

The preferred embodiment of the rotary connector provides the following advantages:

High durability during operation as well as very low likelihood of damage during maintenance;

Contact is replaceable in rare instance of damage;

High electrical current capacity;

Very high shock and vibration tolerance;

Radially and axially compact thus allowing for a smaller form factor connector; and Allows for unitized molded assembly.

FIGS. 7-14 illustrate other embodiments of electrically-conductive contacts 100. It is to be understood that the following embodiments of electrically-conductive contacts 100 include all or some of the above advantages.

The contact 100 shown in FIGS. 7 and 8 is another generally polygonal-shaped contact, generally referred to as 112, having rounded corners or vertices 112c. The generally polygonal-shaped contact 112 shown in FIGS. 7 and 8 includes rounded corners 112c separated by four generally straight segments 112s. Preferably, the generally polygonal-shaped contact 112 is discontinuous and has first and second ends 114f and 114s, respectively. Preferably, the first and second ends 114f and 114s are located such that they would remain within an inwardly facing groove 51 and contact the groove base 51b.

Figure 10:
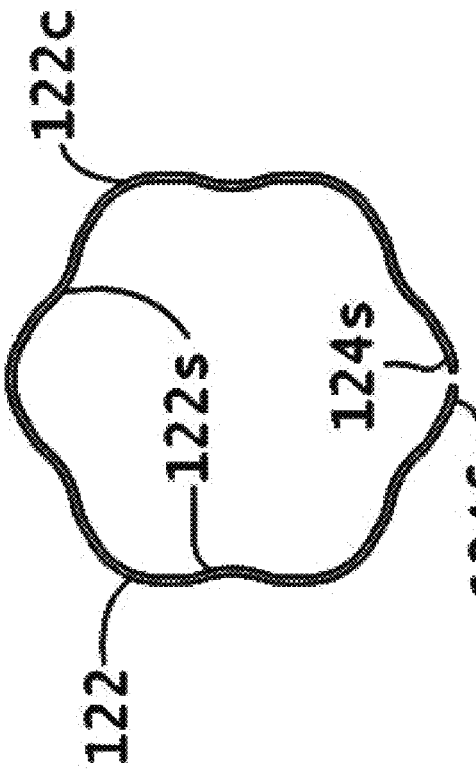
FIG. 10 is a front view of the contact shown in FIG. 9.
Figure 9:
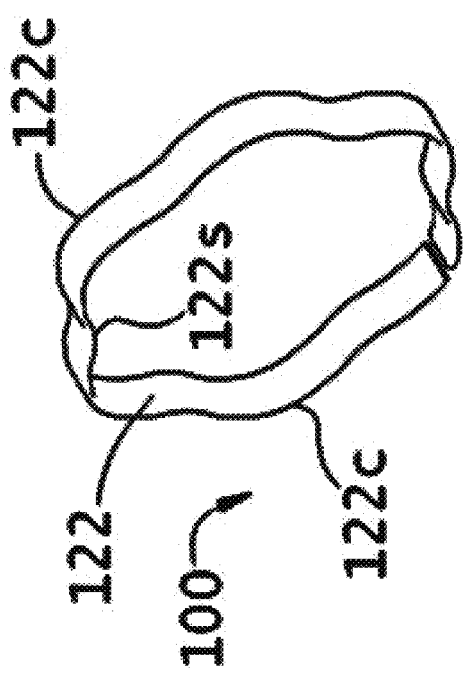
FIG. 9 is a perspective view of a contact according to another embodiment of the invention.

FIGS. 9 and 10 show a generally marcel-shaped contact 122 having a plurality of rounded external corners or vertices 122c. The generally marcel-shaped contact 122 includes a plurality of rounded external corners 122c separated by generally wavy segments 122s. Preferably, the generally marcel-shaped contact 122 is discontinuous and has first and second ends 124f and 124s, respectively. Preferably, the first and second ends 124f and 124s are located such that they would remain within an inwardly-facing groove 51 and contact the groove base 51b.

Figure 12:
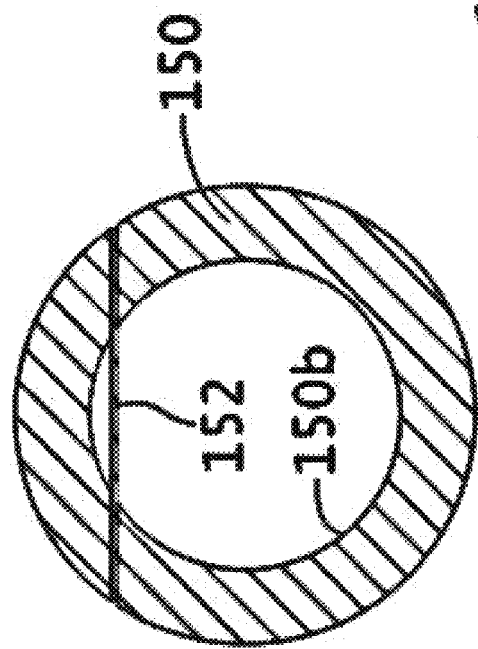
FIG. 12 is a front, cross-sectional view of the conductor ring and contact shown in FIG. 11.
Figure 11:
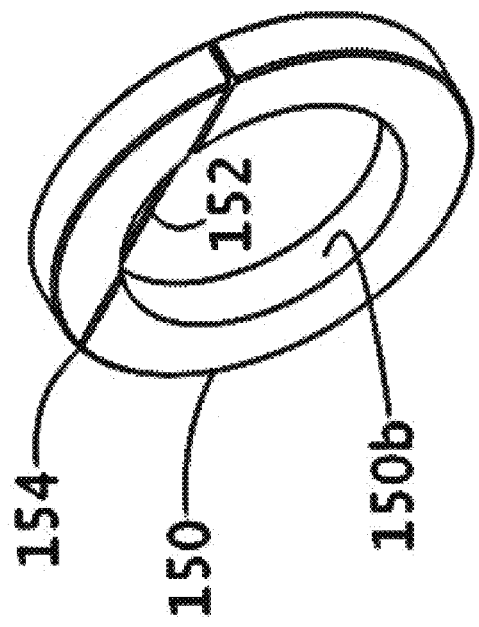
FIG. 11 is a perspective view of an alternative embodiment of a receptacle conductor ring with a contact inserted into a slot in the conductor ring.

FIGS. 11 and 12 show an alternative receptacle conductor ring 150 having an axial inner bore 150b. The axial inner bore 150b may be a continuous axial bore, without the need to have an inwardly-facing groove. A slot 154 extends transversely through the conductor ring 150 and intersects the inner bore 150b at two locations. An electrically-conductive contact 152 in the form of a flexible beam is inserted into the slot and within a portion of the inner bore 150b as shown in FIG. 12. The contact 152 has a relaxed position in which the contact 152 is a substantially straight member passing within the inner bore 150b of the receptacle conductor ring 150 as shown in FIGS. 11 and 12.

Figure 19:
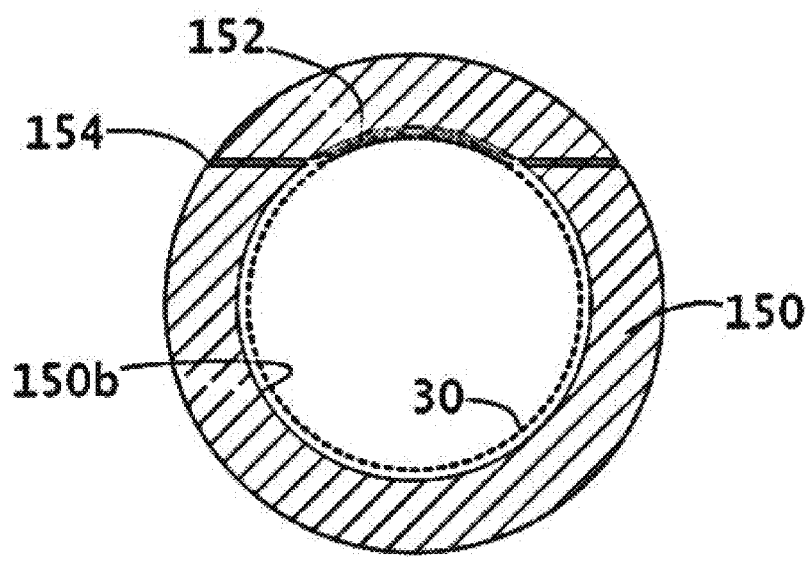
FIG. 19 is a cross-sectional view similar to FIG. 12, showing the receptacle conductor ring with the contact in a deformed position and the plug conductor ring shown in dashed lines.

FIG. 19 is representative of when the plug 20 and receptacle 40 are fully joined or coupled together and the contact 152 is in an elastically deformed position. The outer surface of the plug conductor ring 30 is shown in dashed lines. The outer diameter of the plug conductor ring 30 is sized so that upon mating of the plug with the receptacle, the mating plug conductor ring 30 contacts and elastically deforms the contact 152 within the inner bore 150b. The contact 152 is sufficiently elastic that electrical contact is achieved when deformed by plug connector ring 30, yet when disconnected from the plug the contact 152 returns to its relaxed straight condition. The contact 152 may have a polygonal or rounded cross-section. In this alternative, the contact 152 is replaceable if the receptacle 40 is assembled, for example, by stacking insulator rings and conductor rings.

Figure 14:
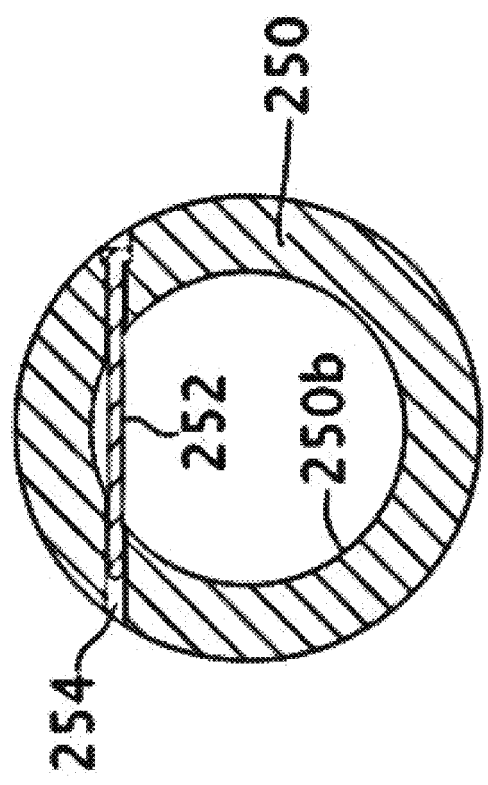
FIG. 14 is a front, cross-sectional view of the conductor ring and contact shown in FIG. 13.
Figure 13:
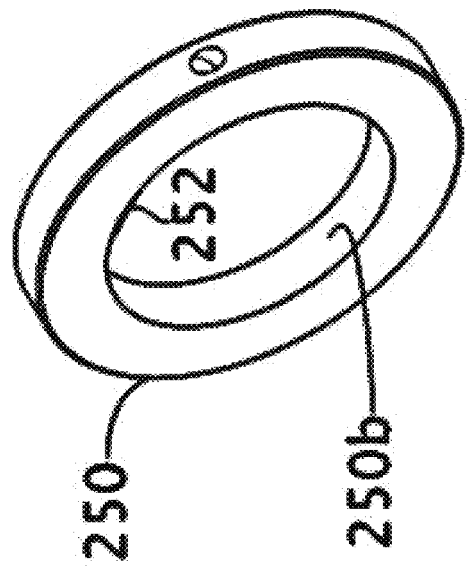
FIG. 13 is a perspective view of an alternative embodiment of the conductor ring with a contact inserted in a hole in the conductor ring.

FIGS. 13 and 14 show another alternative receptacle conductor ring 250 similar to the one shown in FIGS. 11 and 12. FIGS. 13 and 14 show an alternative receptacle conductor ring 250 having an axial inner bore 250b. The axial inner bore 250b may be a continuous axial bore, without the need to have an inwardly-facing groove. A transverse bore 254 extends through the conductor ring 250 and intersects the axial inner bore 250b at two locations. An electrically-conductive contact 252 is inserted into the transverse bore 254 in the conductor ring 250 and within a portion of the axial inner bore 250b as shown in FIG. 14. The contact 252 has a relaxed position in which the contact 252 is a substantially straight member passing within the axial inner bore 250b of the receptacle conductor ring 250 as shown in FIG. 14.

Figure 20:
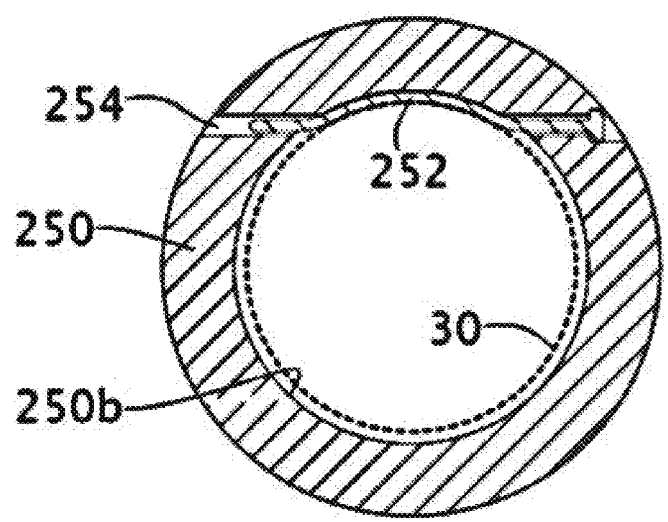
FIG. 20 is a cross-sectional view similar to FIG. 14, showing the receptacle conductor ring with the contact in a deformed position and the plug conductor ring shown in dashed lines.

FIG. 20 is representative of when the plug 20 and receptacle 40 are fully joined or coupled together and the contact 252 is in an elastically deformed position. The outer surface of the plug conductor ring 30 is shown in dashed lines. The outer diameter of the plug conductor ring 30 is sized so that upon mating of the plug 20 with the receptacle 40, the mating plug conductor ring 30 contacts and elastically deforms the contact 252 within the inner bore 250b. The contact 252 is sufficiently elastic that electrical contact is achieved when deformed by plug connector ring 30, yet when disconnected from the plug the contact 252 returns to its relaxed straight condition. Preferably, the contact 252 has a circular cross-section. If the contact 252 is press-fitted in the conductor ring 250, this embodiment may be used in a molded assembly. If the contact 252 is not press-fitted and the receptacle can be disassembled, the contact 252 may be replaceable.

Figure 15:
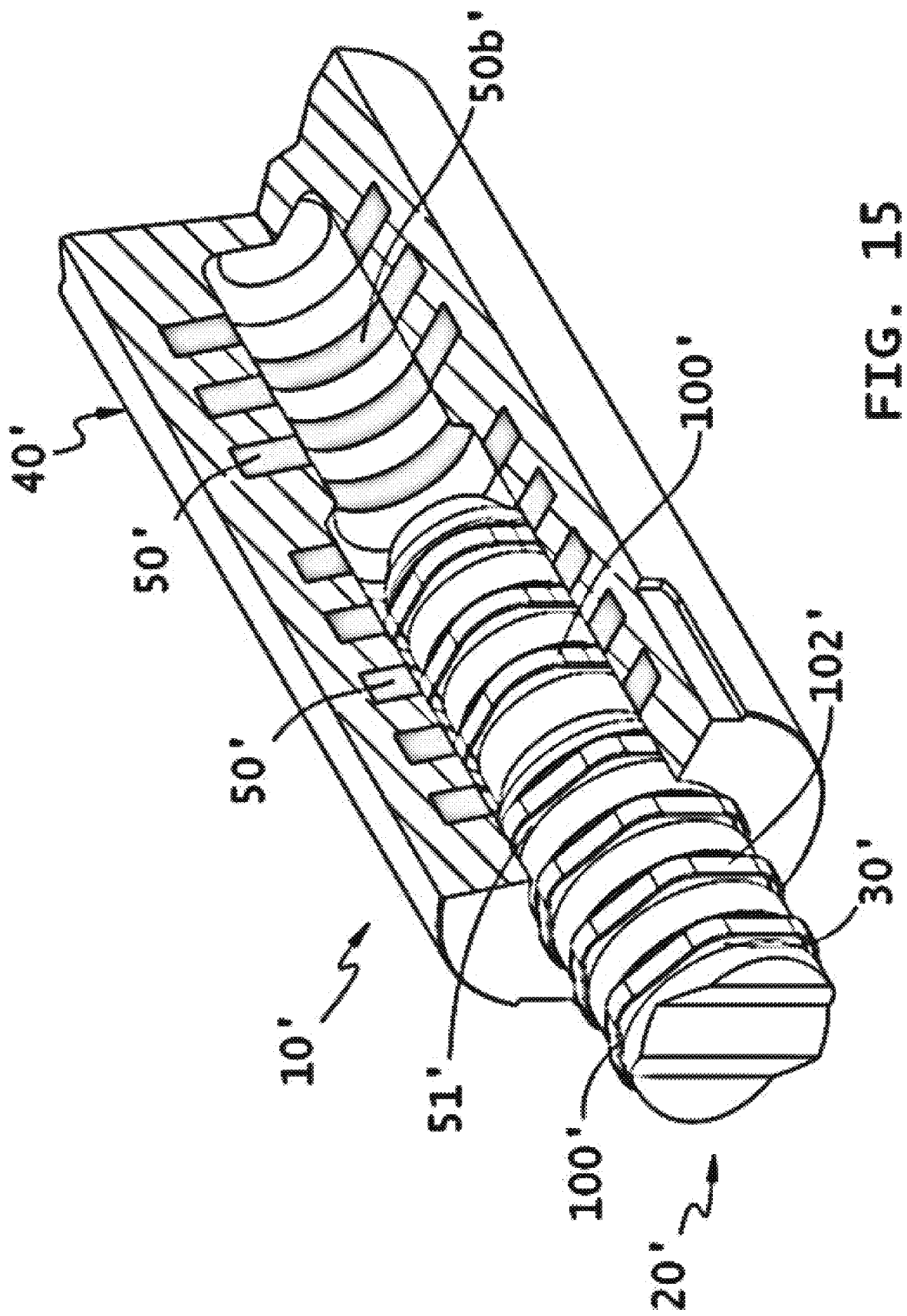
FIG. 15 is a partial perspective view of an alternative embodiment of the rotary connector, the perspective view having a portion of the receptacle removed and showing the plug partially within the receptacle and with electrically-conductive contacts installed on the plug.
Figure 16:
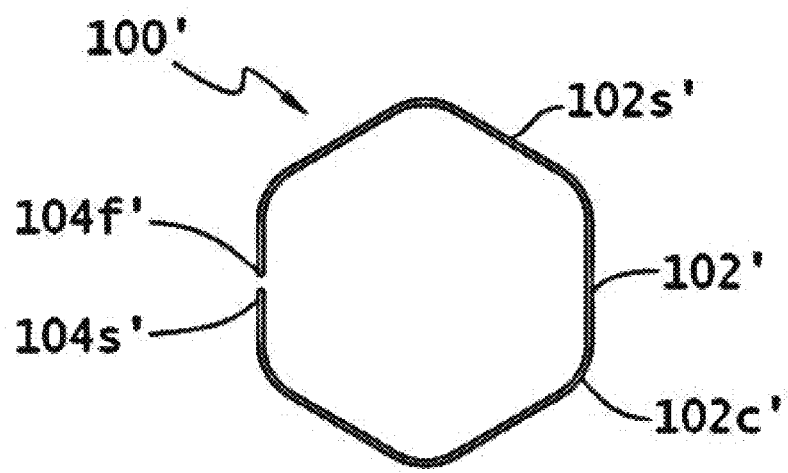
FIG. 16 is a front view of an embodiment of an electrically-conductive contact for installation on the plug.

FIG. 15 shows an alternative embodiment of the rotary connector, generally designated 10', which is similar in many respects with the rotary connector 10 shown in FIGS. 1 and 2. The primary difference is that the rotary connector 10' has the electrically-conductive contacts 100' installed on the plug conductor rings 30', preferably in outwardly-facing grooves 51' and the receptacle conductor rings 50' have a smooth inner bore 50b'. The contact 102' shown is similar in shape to the contact 102 of FIGS. 3 and 4. The contact 102' is discontinuous and preferably has first and second ends 104f' and 104s' at a mid-portion of a generally straight segment 102s' as shown in FIG. 16.

Figure 17:
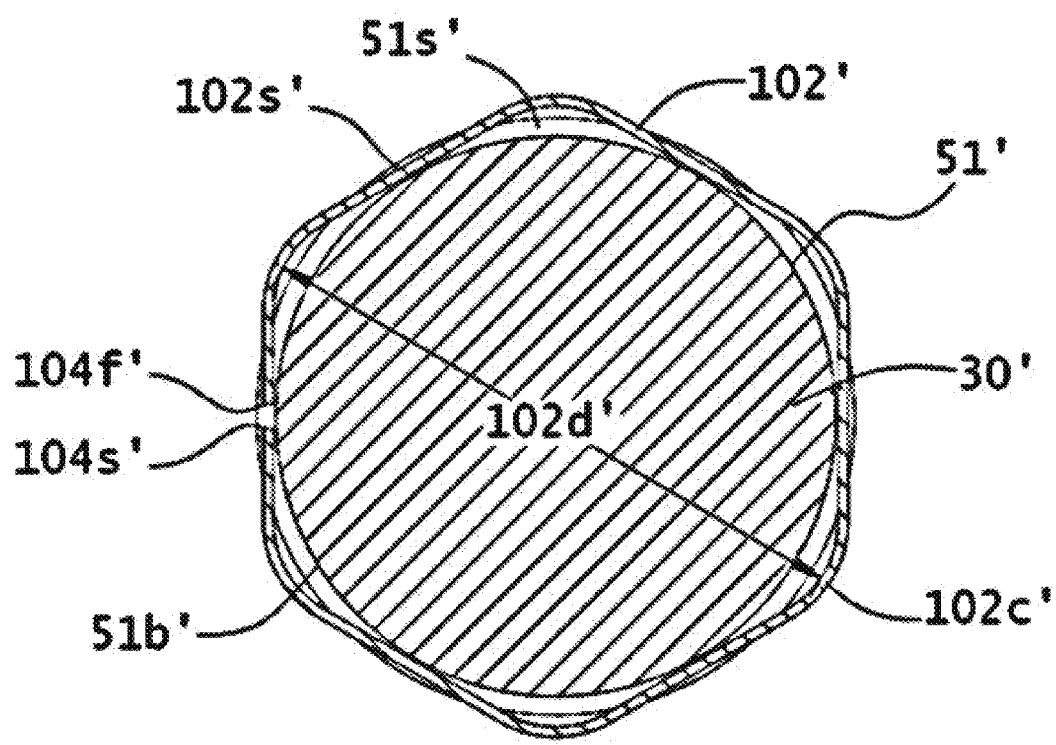
FIG. 17 is a cross-sectional view of the contact of FIG. 16 received in a groove of a conductor ring in the plug, the contact shown in a relaxed position.

FIG. 17 shows a cross-sectional view of the six-sided polygonal-shaped contact 102' received within the groove 51' of the plug conductor ring 30'. The groove 51' preferably has a pair of sidewalls 51s' (only one shown) joined by a groove base 51b' defining a groove width and a groove depth. The contact 102' is in a relaxed position and has a relaxed inscribed diameter 102d'. The rounded corners 102c' in the relaxed position define the relaxed inscribed diameter 102d'. For the contact 102' shown in FIG. 17, the relaxed inscribed diameter 102d' is the longest distance between oppositely facing rounded corners 102c'. At least a portion, typically a mid-portion, of the rounded corners 102c' is positioned outside of the groove 51' in the relaxed position as shown in FIG. 17. Preferably, the relaxed inscribed diameter 102d' is larger than the inside diameter of the receptacle conductor ring 50'. Preferably, the relaxed inscribed diameter 102d' is larger than the outside diameter of the corresponding plug conductor ring 30'.

Still referring to FIG. 17, the contact 102' is in the relaxed position when the plug 20' is uncoupled from the receptacle 40' and when the receptacle 40' is not juxtaposed or contacting the contact 102'. The first and second ends 104f' and 104s' of the generally polygonal-shaped contact 102' are preferably adjacent the groove base 51b' and preferably have an edge portion contacting the groove base 51b'. Preferably, a portion of each of the generally straight segments 102s' is in contact with the groove base 51b' when in the relaxed position.

Figure 18:
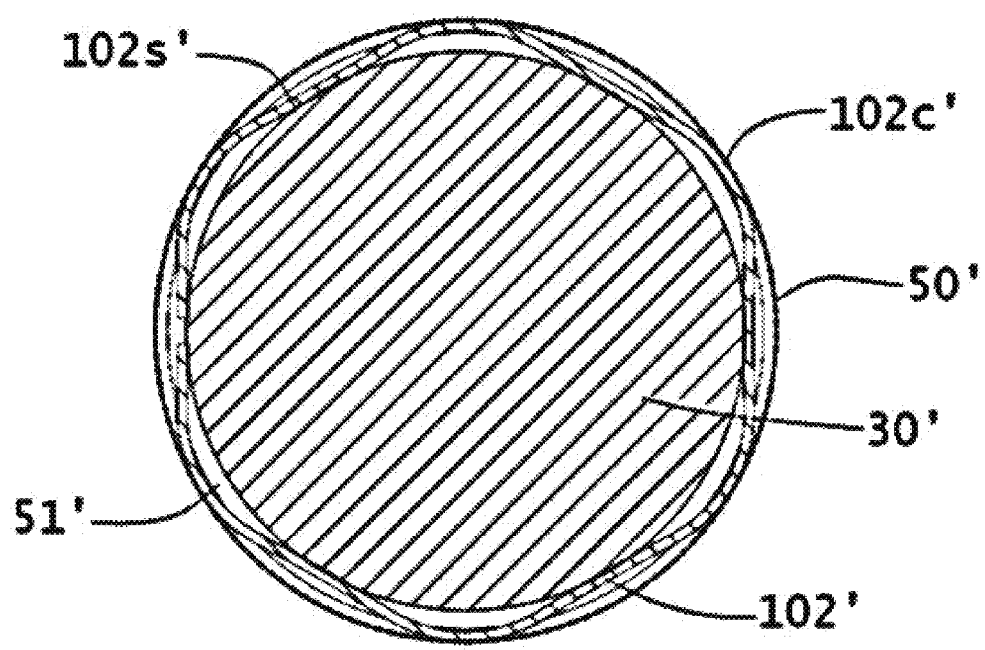
FIG. 18 is a cross-sectional view similar to FIG. 17, showing the contact in a deformed position with the conductor ring of the receptacle shown in dashed lines.

FIG. 18 is representative of when the plug 20' and receptacle 40' are fully joined or coupled together and the contact 102' is in an elastically deformed position. The inner surface of the receptacle conductor ring 50' is shown in dashed lines. Since the inner diameter of the receptacle conductor ring 50' is preferably at least slightly smaller than the relaxed inscribed diameter 102d' of the contact 102', the juxtaposed receptacle conductor ring 50' forces the contact 102' to become slightly more circular. As shown in FIG. 18, the elastically deformed contact 102' provides a substantial amount of surface area contact with the inner surface of the receptacle conductor ring 50' while concurrently retaining substantial contact with the groove base 51b'. It is also to be understood that a portion of the side surfaces of the contact 102' facing the groove sidewalls 51s' will also likely be in contact with at least one of the sidewalls 51s'. The contact 102' is sufficiently elastic such that electrical contact is achieved and maintained between the corresponding plug and receptacle conductor rings 30', 50', when the plug 20' and receptacle 40' are fully mated, yet when the plug 20' is disconnected or removed from the receptacle 40' the contact 102' remains in the groove 51' and returns to its relaxed position with an inscribed diameter 102d' larger than the inner diameter of the mating receptacle conductor ring 50'.

It is to be understood that the groove in the conductor ring in the above described embodiments will vary based on the size, shape and type of contact. The groove is designed to create the required force for each size of contact.

It is to be understood that the cross-section shapes of the contacts in the figures are not limited to the shape illustrated (i.e., rectangular) but may comprise other shapes including, but not limited to, round.

It is to be understood that insulators between adjacent contacts can be discrete pieces or a unitized molded system. Additionally, the system allows for optional hermetic sealing of electrical connector within mating housings.

An analysis of the force required for the contact 102 shown in FIGS. 3 and 4 to yield in bending where the width 102w is 0.06", thickness 102t is 0.008" and length is 0.17" results in a force of 1.58 Newtons or 0.355 lbs. Comparable analysis for the multi-leaf spring and the canted coil spring designs described in the Background of the Invention result in yielding with forces significantly lower than for the preferred embodiment as shown below:

| Design | Force (Newtons) | Force (Pounds) |
| --- | --- | --- |
| FIGS. 3-4 Embodiment | 1.58 | 0.355 |
| Multi-Leaf Spring | 0.075 | 0.017 |
| Canted Coil Spring | 0.175 | 0.039 |

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. An electrical connector (10) comprising:
  a) a plug (20) comprising:
    i) an electrically-insulating plug body (22);
    ii) a plug conductor ring (30); and
    iii) an electrically-conductive member (W) connected to the plug conductor ring (30) within the plug body (22) and exiting an end of the plug body (22); and
  b) a receptacle (40) comprising:
    i) an electrically-insulating receptacle body (42);
    ii) a receptacle conductor ring (150, 250), the receptacle conductor ring (150, 250) having an axial inner bore (150b, 250b) and a transverse opening (154, 254) intersecting the axial inner bore (150b, 250b) at two locations;
    iii) an electrically-conductive member (W) connected to the receptacle conductor ring (150, 250) and exiting an end of the receptacle body (40);
    iv) an electrically-conductive contact (152, 252) received in the transverse opening (154, 254) and having a relaxed position and an elastically-deformed position, wherein in the relaxed position the electrically-conductive contact (152, 252) is a substantially straight member and extends transversely within the axial inner bore (150b, 250b) of the receptacle conductor ring (150, 250), and in the elastically-deformed position, the electrically-conductive contact (152, 252) is elastically deformed within the axial inner bore (150b, 250b) by the plug conductor ring (30), the plug conductor ring (30) contacting the electrically-conductive contact (152, 252)

and electrical contact is achieved between the plug conductor ring (30) and the receptacle conductor ring (150, 250), and upon removal of the plug conductor ring (30) from contact with the electrically-conductive contact (152, 252), the electrically-conductive contact (152, 252) returns to its relaxed position.

2. The electrical connector (10) of claim 1, wherein the electrically-conductive contact (152) has a polygonal cross-section.

3. The electrical connector (10) of claim 1, wherein the electrically-conductive contact (152) has a circular cross-section.

4. The electrical connector (10) of claim 1, wherein the transverse opening is a slot (154) and the electrically-conductive contact (152) is a flexible beam.

5. The electrical connector (10) of claim 1, wherein the transverse opening is a transverse bore (254) and the electrically-conductive contact (252) has a circular cross-section.

6. The electrical connector (10) of claim 5, wherein the electrically-conductive contact (252) is press-fitted in the transverse bore (254) of the conductor ring (250).

7. An electrical connector (10) comprising:
a) a plug (20) comprising:
   i) an electrically-insulating plug body (22);
   ii) a plug conductor ring (30); and
   iii) an electrically-conductive member (W) connected to the plug conductor ring (30) within the plug body (22) and exiting an end of the plug body (22); and
b) a receptacle (40) comprising:
   i) an electrically-insulating receptacle body (42);
   ii) a receptacle conductor ring (150) having an axial inner bore (150b) and a transverse slot (154) in the receptacle conductor ring (150) interrupted by the axial inner bore (150b) such that the transverse slot has two aligned transverse slot portions separated by the axial inner bore (150b);
   iii) an electrically-conductive member (W) connected to the receptacle conductor ring (150) and exiting an end of the receptacle body (40);
   iv) an electrically-conductive contact (152) received in the two aligned transverse slot portions and having an electrically-conductive contact portion in the axial inner bore (150b), the electrically-conductive contact (152) having a relaxed position and an elastically-deformed position,
   wherein in the relaxed position the electrically-conductive contact (152) is a substantially straight member and extends transversely within the axial inner bore (150b) of the receptacle conductor ring (150), and
   in the elastically-deformed position, the electrically-conductive contact (152) is elastically deformed within the axial inner bore (150b) by the plug conductor ring (30), the plug conductor ring (30) contacting the electrically-conductive contact (152) and electrical contact is achieved between the plug conductor ring (30) and the receptacle conductor ring (150), and
   upon removal of the plug conductor ring (30) from contact with the electrically-conductive contact (152), the electrically-conductive contact (152) returns to its relaxed position.

8. The electrical connector (10) of claim 7, wherein the electrically-conductive contact (152) has a polygonal cross-section.

9. The electrical connector (10) of claim 7, wherein the electrically-conductive contact (152) has a circular cross-section.

10. The electrical connector (10) of claim 7, wherein the electrically-conductive contact (152) is a flexible beam.

11. An electrical connector (10) comprising:
a) a plug (20) comprising:
   i) an electrically-insulating plug body (22);
   ii) a plug conductor ring (30); and
   iii) an electrically-conductive member (W) connected to the plug conductor ring (30) within the plug body (22) and exiting an end of the plug body (22); and
b) a receptacle (40) comprising:
   i) an electrically-insulating receptacle body (42);
   ii) a receptacle conductor ring (250) having an axial inner bore (250b) and a transverse bore (254) in the receptacle conductor ring (250) interrupted by the axial inner bore (250b) such that the transverse bore (254) has two aligned transverse bore portions separated by the axial inner bore (250b);
   iii) an electrically-conductive member (W) connected to the receptacle conductor ring (250) and exiting an end of the receptacle body (40);
   iv) an electrically-conductive contact (252) received in the two aligned transverse bore portions and having an electrically-conductive contact portion in the axial inner bore (250b), the electrically-conductive contact (252) having a relaxed position and an elastically-deformed position,
   wherein in the relaxed position the electrically-conductive contact (252) is a substantially straight member and extends transversely within the axial inner bore (250b) of the receptacle conductor ring (250), and
   in the elastically-deformed position, the electrically-conductive contact (252) is elastically deformed within the axial inner bore (250b) by the plug conductor ring (30), the plug conductor ring (30) contacting the electrically-conductive contact (252) and electrical contact is achieved between the plug conductor ring (30) and the receptacle conductor ring (250), and
   upon removal of the plug conductor ring (30) from contact with the electrically-conductive contact (252), the electrically-conductive contact (252) returns to its relaxed position.

12. The electrical connector (10) of claim 11, wherein the electrically-conductive contact (252) has a circular cross-section.

13. The electrical connector (10) of claim 12, wherein the electrically-conductive contact (252) is press-fitted in the transverse bore (254) of the conductor ring (250).

\* \* \* \* \*